UNITED STATES PATENT OFFICE.

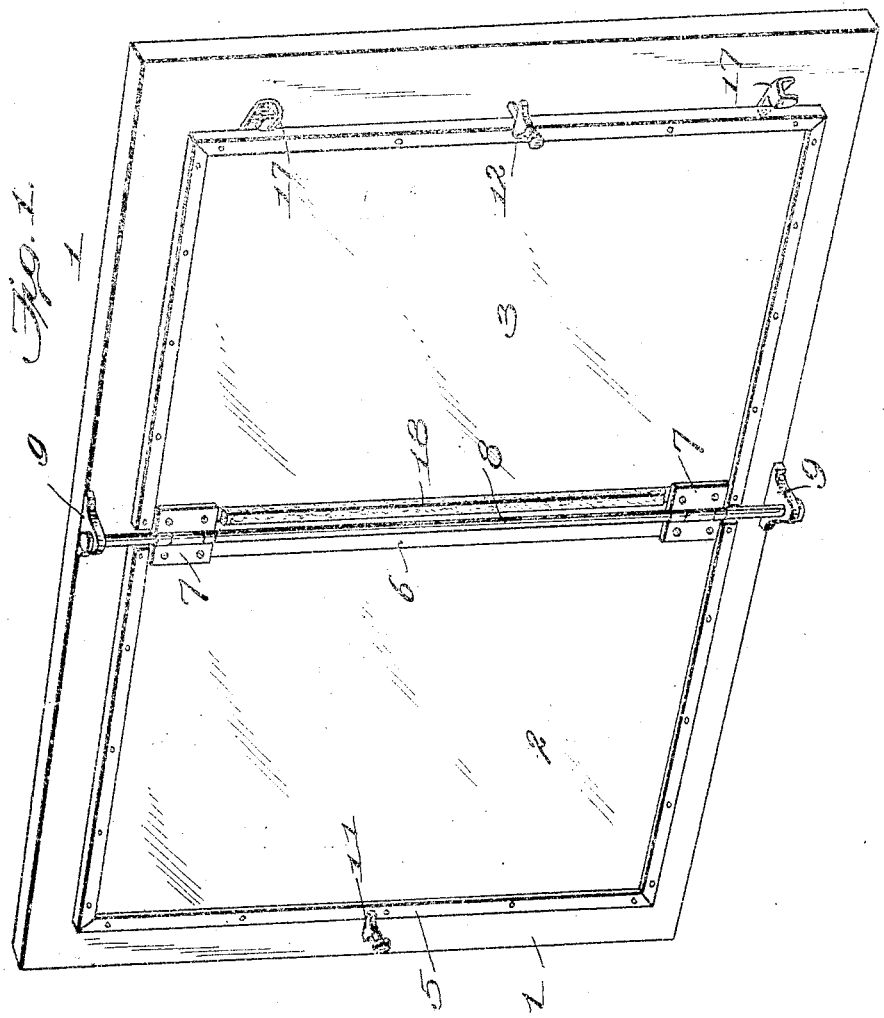

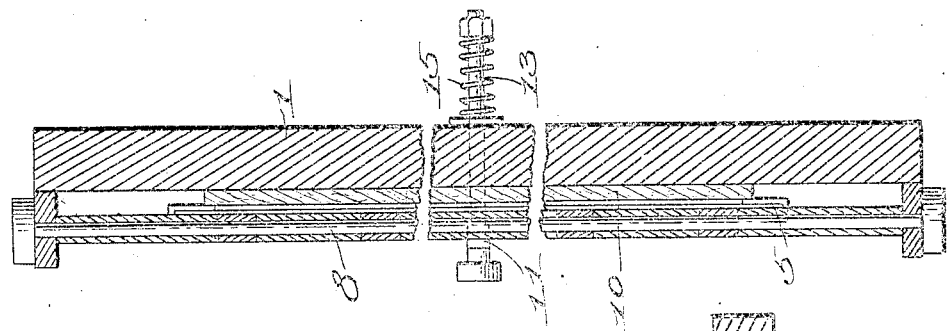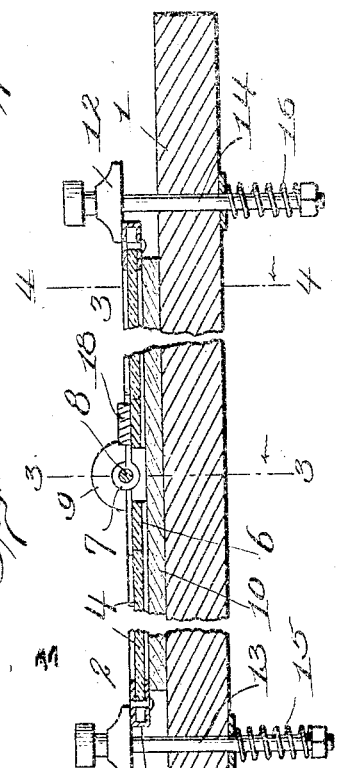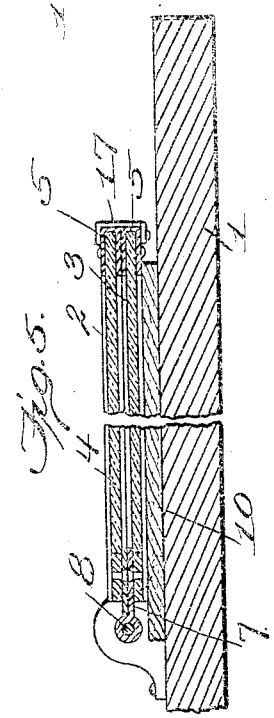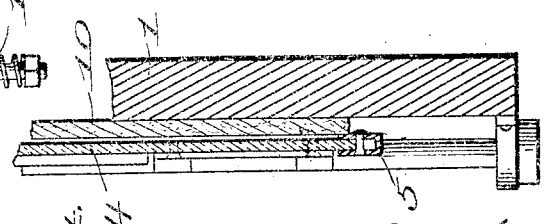

EZRA B. FISH, OF KANSAS CITY, MISSOURI, ASSIGNOR TO THE CAMERAGRAPH COMPANY, OF KANSAS CITY, MISSOURI, A CORPORATION OF ARIZONA.

PHOTOGRAPHIC COPY-HOLDER.

1,112,369.  Specification of Letters Patent.  Patented Sept. 29, 1914.

Application filed July 1, 1913. Serial No. 776,891.

*To all whom it may concern:*

Be it known that I, EZRA B. FISH, a citizen of the United States, residing at Kansas City, in the county of Jackson and State of Missouri, have invented new and useful Improvements in Photographic Copy-Holders, of which the following is a specification.

The present invention relates to improvements in photographic apparatus and more especially to means for holding the objects from which the photographic reproductions are to be made.

The primary object of the invention is to provide copy-holding means whereby the reproduction of the matter contained on two sheets at, say, one exposing operation, and the reproduction of the matter contained on both sides of one sheet, such for example as a deed, check, or the like, is greatly facilitated.

To these and other ends, the invention consists in certain improvements, and combinations and arrangements of parts, all as will be hereinafter more fully described, the novel features being pointed out particularly in the claims at the end of the specification.

In the accompanying drawing: Figure 1 is a perspective view of a copyholder constructed in accordance with the present invention; Fig. 2 represents a horizontal section through the copyholder; Fig. 3 represents a vertical transverse section through the copyholder on the line 3—3 of Fig. 2; Fig. 4 represents a similar section on the line 4—4 of Fig. 2; Fig. 5 is a view similar to Fig. 2 showing the copyholding members in a different position.

Similar parts are designated by the same reference characters in the several views.

Copyholders embodying the present invention are adapted for use generally in connection with photographic cameras for the purpose of holding the copy or matter to be reproduced.

While the invention is not limited in its use to any particular type of photographic camera, it is especially adapted for use in connection with photographic apparatus such as that shown in the patent to William R. Schwab, No. 1,003,300, granted September 12, 1911. It will also be understood that the invention is not restricted to the precise construction shown, as equivalent constructions may be used within the scope of the claims at the end of this specification.

In the present instance, the copyholder embodies a board or other flat support 1 which may be mounted in any suitable manner in appropriate relation to the camera. At the front of this board is arranged a pair of copyholding members 2 and 3, each member consisting preferably of a plate or sheet of glass or other rigid transparent material 4, a channel-shaped frame 5 which borders and is secured to the margin of the transparent plate at three sides, and a bar 6 which is arranged at the inner edge of each transparent plate and is secured to the frame 5. The copyholding members are pivotally connected by hinges 7 which latter are preferably secured to the bars 6 of the respective members, and these members are also pivotally connected to the board or support 1, preferably by a hinge pintle or rod 8, which latter forms an axis for the hinges 7 and is secured to the board or support 1 by the brackets 9. A pad 10 of felt or other suitable material is arranged at the forward side of the board or support 1 and provides surfaces at opposite sides of the rod 8 to receive the sheets containing the matter to be reproduced, and the members 2 and 3 are adapted to be swung into superposed relation with the sheets so placed, thereby pressing them evenly against the pad, the matter on the sheets to be reproduced being visible through the transparent plates of the respective members. Suitable means is provided for retaining the copyholding members in such position. In the present instance, a pair of clamps 11 and 12 are provided, these clamps having rods or stems 13 and 14 which extend through the board or support 1 and are provided at the rear thereof with compression springs 15 and 16, these springs acting to draw the clamps toward the face of the board 1 and thereby press the respective copyholding members 2 and 3 firmly against the pad, thus retaining the sheets in correct positions. The clamps may be turned so as to bring them either into positions to bear upon the copyholding members or to clear these members and thereby permit the latter to be swung away from the pad 10 to enable the sheets to be changed. The copyholding members may also be brought into superposed relation to one another to receive and retain between them a sheet containing matter on both sides thereof, the matter on opposite sides of the sheet being made visible by swinging both copyholding members bodily to each side of the axis 8. To facilitate this operation, means is provided for retaining the two copyholding members in adjacent coöperative relation, a pair of clips 17 being provided in the present instance which are pivotally connected to one of the members and have wings or projections which are adapted to coöperate with the margins of the two members and thereby hold them together, enabling these members to be swung bodily from one side to the other side of the axis 8 without disturbing the position of the sheet interposed and held between them. The clamps 11 and 12 may also be used in the latter operations to retain the two copyholding members at the respective sides of the axis 8.

In making photographic reproductions of the matter contained on two separate sheets or pages by the aid of a photographic apparatus such as that shown in the patent above-mentioned, the copyholder will be mounted in a position where the axis 8 will be in substantial alinement with the axis of the lens and the sheets will be placed on the pad 10 and held in proper position thereon by the respective copyholding members which will then occupy the positions shown in Figs. 1 and 2, the matter contained on the faces of the sheets being visible for exposure through the glass or transparent plates of the respective copyholding members. The matter contained on the two sheets may then be exposed either simultaneously or at one exposing operation, in which case the shutter slides of the photographic camera will both be opened, or the photographic reproductions may be made successively or by two exposing operations by closing one of the shutter slides while the other is open, and vice versa. When it is desired to obtain a photographic reproduction of the matter contained on both sides of a sheet, as in copying deeds, checks, and the like, the sheet is placed between the copyholding members and the latter are then secured together by the clips. A strip 19 of felt or other suitable material is preferably secured to the bar 6 of one of the members in order to hold the sheet in proper position when placed between the members. The copyholding members with the sheet between them are then swung against the pad 10 at one side of the axis 8 and held in such position while an exposure is made of the visible side of the sheet. In performing this operation by the aid of a camera such as that shown in the patent hereinbefore mentioned, one of the shutter slides of the camera will be closed while the other slide is open. After exposure has been made of one side of the sheet, the members containing the sheet between them are swung bodily about the axis 8 and brought into a position at the opposite side thereof and held in position by the respective clamp, and by reversing the positions of the shutter slides of the camera, the second exposure may be made to obtain a reproduction of the opposite side of the sheet.

The copyholder embodying the present invention is relatively simple in its construction and it greatly facilitates the positioning of the originals from which the photographic reproductions are to be made. Furthermore, it prevents shifting of the position of the sheets to be reproduced, particularly when it is desired to reproduce both sides of a single sheet, thereby insuring correct location of the reproductions on the sensitized medium.

I claim as my invention:—

1. Photographic apparatus of the class described comprising a support, and copyholding members connected thereto and movable into positions to hold separate objects beneath them or into positions to hold an object between them.

2. Photographic apparatus of the class described comprising a support, and copyholding members pivotally connected thereto and movable into opposite positions relatively to said support, and also movable into superposed relation relatively to one another.

3. Photographic apparatus of the class described comprising a support, and a pair of members movable into opposite positions on said support to hold objects thereon, and also movable into superposed relation with one another to hold an object between them.

4. Photographic apparatus of the class described comprising a support, and a pair of members pivotally connected thereto and movable into opposite positions relatively to said support and also movable bodily into superposed relation relatively to one another.

5. A photographic copyholder comprising a support, and a pair of members pivotally connected thereto and movable into positions at opposite sides of their pivotal axis to hold sheets against said support and also movable into superposed relation to hold a sheet between them.

6. A photographic copyholder comprising a support, a pair of members pivotally connected thereto and movable individually into positions at opposite sides of their pivotal axis to hold sheets against said support and also movable into superposed relation to each other to hold a sheet between them, and means for connecting said members while in superposed relation whereby they may be swung bodily into opposite positions relatively to said support.

7. Photographic apparatus of the class described comprising a support, a pair of copyholding members pivotally connected to one another and to said support, means for holding said members against said support in opposite relation to one another, and means for holding said members together while in superposed relation and permitting the same to swing bodily relatively to the support.

In testimony whereof I have hereunto set my hand in presence of two subscribing witnesses.

EZRA B. FISH.

Witnesses:
A. L. PARKS,
J. A. COPE.